United States Patent [19]

Butler et al.

[11] 3,933,605
[45] Jan. 20, 1976

[54] NON-POLLUTING PICKLING METHOD

[75] Inventors: Thomas J. Butler, Monroeville; Robert M. Hudson, Churchill; Clair J. Warning, Plum, all of Pa.

[73] Assignee: United States Steel Corporation, Pittsburgh, Pa.

[22] Filed: June 20, 1974

[21] Appl. No.: 481,011

Related U.S. Application Data

[63] Continuation-in-part of Ser. No. 415,084, Nov. 12, 1973, abandoned.

[52] U.S. Cl. .................. 204/151; 134/10; 204/149; 204/180 P
[51] Int. Cl.² ......................................... B01D 13/02
[58] Field of Search .......... 204/180 P, 130, 112, 48, 204/86, 151; 134/2, 10

[56] References Cited
UNITED STATES PATENTS

| | | | |
|---|---|---|---|
| 2,637,634 | 5/1953 | Howard et al. | 134/3 X |
| 3,010,854 | 11/1961 | Satterfield | 134/27 |
| 3,124,520 | 3/1964 | Juda | 204/86 |
| 3,181,984 | 5/1965 | Tillis | 134/3 X |
| 3,481,851 | 12/1969 | Lancy | 204/180 P |
| 3,591,432 | 7/1971 | Vaztrani | 134/3 X |
| 3,761,369 | 9/1973 | Tirrell | 204/180 P X |

*Primary Examiner*—John H. Mack
*Assistant Examiner*—A. C. Prescott
*Attorney, Agent, or Firm*—William L. Krayer

[57] ABSTRACT

Fluoboric acid is used to pickle steel, particularly hot rolled steel, in either a continuous strip or batch operation. The spent acid is recycled after treatment by electrolysis using compartmented cells separated by a membrane.

8 Claims, No Drawings

NON-POLLUTING PICKLING METHOD

This is a continuation-in-part of our application Ser. No. 415,084, filed Nov. 12, 1973, now abandoned.

BACKGROUND OF THE INVENTION

Iron and steel products become coated with an oxide scale during their process of manufacture; the presence of this scale is objectionable when the material is processed further. For example, the oxide scale must be removed and a clean surface provided if satisfactory results are to be obtained from hot-rolled sheet or strip in any operation involving deformation of the product. If sheets are manufactured for drawing applications, removal of the oxide scale is essential, as its presence on the steel surface tends to shorten die life, cause irregular drawing conditions, and destroy the surface smoothness of the finished product. If the sheet or strip is to be used in further processing involving coating, oxide removal is necessary to permit proper alloying or adherence of metallic coatings and satisfactory adherence when a non-metallic coating or paint is used. In the production of cold-reduced steel sheet and strip, it is necessary that the oxide resulting during hot rolling of the slab to breakdown form be removed completely before cold reduction to prevent lack of uniformity and eliminate surface irregularities.

Pickling is the chemical process used to remove the oxide by the action of water solutions of inorganic acids, usually either sulfuric acid ($H_2SO_4$) or hydrochloric acid (HCl). When steel or iron materials are immersed in solutions of these acids a portion of the oxide scale is dissolved and, to some extent, the acid penetrates cracks in the scale and a portion of the scale is undercut and lifted off. Unless an inhibitor is added to the pickling solution excessive base metal dissolution may occur in a batch operation or in a continuous operation during a line stop. Further, large quantities of spent pickle liquor result from these operations and, though recovery methods have been developed, they involve appreciable capital investment and produce by-products such as hydrated ferrous sulfate or finely divided iron oxide mixtures that, themselves, present disposal problems. The matter is complicated by pollution abatement legislation that limits the applicability of neutralization and dumping of sludge that has been largely employed heretofore.

We are not aware of any references in the literature to the use of fluoboric acid for chemical pickling (absence of electric current) hot rolled steel.

The reader may be interested in reviewing DeBruyne U.S. Pat. No. 3,654,099, which describes the use of $HBF_4$ in an aqueous acid bath for cathodic treatment of stainless steel to activate it prior to electroplating. D'Aquila et al, in U.S. Pat. No. 2,920,023 employs a fluoborate salt in a molten bath for electrolytic cleaning of ferrous metal cleaning.

For general background, the following U.S. Patents may also be of interest: U.S. Pat. Nos. 3,694,334, 3,383,324, 3,280,038, 3,230,172, 3,304,246, 3,096,261, 2,773,023, 2,760,927, 3,627,654, 3,660,253 and 3,293,159.

The use of an anion permselective membrane to remove iron values from spent fluoboric acid has also not been suggested prior to our invention, so far as we know.

SUMMARY OF THE INVENTION

It is an object of our invention to provide a pickling solution that can be used to remove scale from iron or steel products at practical rates, that will not excessively attack the base metal if the steel is in contact with the solution after scale removal is completed, and that will result in a spent pickle liquor that will be amenable to an efficient recovery method that results in recyclable products and that complies with limitations imposed by pollution abatement regulations.

Practical descaling rates (60 seconds or less) for continuous pickling of hot-rolled low-carbon steel strip are shown for coupons immersed in fluoboric acid in Table I. The time available for descaling in batch operations (usually 20 minutes or longer) is sufficient for all conditions studied. Pickling time required in fluoboric acid is dependent on temperature and acid concentration. With non-temper-rolled steel at least 175°F and 130 g/l acid are required to pickle in less than 60 seconds. Steel which has been temper-rolled 3 percent can be pickled in less than 60 seconds at 150°F in a 65 g/l acid solution. Fluoboric acid pickling rates are not appreciably decreased by increases in iron concentration. with non-temper-rolled steel in solutions at 175°F the pickling times (determined when 100% of the oxide was removed) exceeded 60 seconds only when 108 g/l iron was present. With temper-rolled steel all pickling times were under 60 seconds and in this respect compare favorably with times required for $H_2SO_4$ or HCl pickling. Unlike $H_2SO_4$ and HCl, which completely remove scale in minimum times, fluoboric acid changes the scale to a sludge which can be removed by ordinary scrubbing and rinsing.

Table I

Descaling Times Required for Hot-Rolled Low-Carbon Steel Strip in Fluoboric Acid Solutions

| Solution Temperature °F | Concentration in Solution, g/l | | Descaling Time, seconds | |
|---|---|---|---|---|
| | $HBF_4$ | Fe | Non-Temper Rolled Steel | Steel Temper-Rolled 3% |
| 150* | 65 | 0 | ** | 50 |
| 150 | 130 | 0 | 90 | 45 |
| 175*** | 65 | 0 | 90 | 40 |
| 175 | 65 | 43 | ** | 50 |
| 175 | 65 | 108 | ** | 50 |
| 175 | 130 | 0 | 40 | 20 |
| 175 | 130 | 14 | 55 | ** |
| 175 | 130 | 29 | 50 | ** |
| 175 | 130 | 43 | 55 | 25 |
| 175 | 130 | 108 | 70 | 25 |
| 200**** | 65 | 0 | 30 | 20 |
| 200 | 65 | 43 | 45 | 25 |
| 200 | 65 | 108 | 50 | 25 |
| 200 | 130 | 0 | 35 | 20 |
| 200 | 130 | 14 | 35 | ** |
| 200 | 130 | 29 | 35 | ** |
| 200 | 130 | 43 | 35 | 15 |
| 200 | 130 | 108 | 40 | 30 |

*66°C
**Not determined
***79°C
****93°C

The attack of fluoboric acid solutions on hot-rolled low-carbon steel during a one hour immersion test was much less than the attack that occurs on the steel base in eigher $H_2SO_4$ or HCl solutions; see Table II. Metal dissolution was determined by weight loss of the coupons. Commercially, inhibitors that afford at least 90 percent inhibition are used with $H_2SO_4$ and with HCl to avoid over-pickling of strip during line stops. We may avoid the use of an inhibitor and still achieve satisfactory results with $HBF_4$.

Table II

Base Metal Dissolution during One Hour Immersion of Hot-Rolled Low-Carbon Steel in Uninhibited Pickling Solutions

| Solution | Iron Content in Solution g/l | Temperature °F | Weight Loss From Samples Base Metal Dissolved mg/cm² | |
|---|---|---|---|---|
| | | | Non-Temper Rolled Steel | Steel Temper Rolled 3% |
| $H_2SO_4$, 280 g/l | 10 | 200* | 198 | 206 |
| HCl, 100 g/l | 100 | 200 | 158 | 184 |
| HCl, 100 g/l | 100 | 175** | 88 | 100 |
| HCl, 60 g/l | 100 | 175 | 79 | *** |
| $HBF_4$, 130 g/l | 0 | 200 | 27 | 30 |

*93°C
**79°C
***Not determined

Laboratory experiments have been carried out on the recovery of acid and iron from $HBF_4$—$Fe(BF_4)_2$ solutions similar to those that would result if fluoboric acid was used for pickling of hot-rolled strip. For comparison some runs were also made using simulated HCl and $H_2SO_4$ spend pickle liquors. Electrolysis runs were made using two-compartment cells. The solutions were analyzed for iron and for free acid. The steel cathodes were weighed before and after each run to determine the amount of iron deposited. Anodes were made of graphite and an anion permselective membrane (Ionac Chemical Company, No. MA3475R, 0.015 inch thick) was used to separate the catholyte and anolyte compartments. This membrane has an electrical resistance in 0.1 N NaCl of 10.5 ohms/cm² and in 1.0 N NaCl of 5.2 ohms/cm², a permselectivity of 99% when separating a 1.0 N NaCl solution from a 0.5 N NaCl solution, a thickness of 14–15 mils and a capacity of 1.13 meq./g. While we may use any commercial electrodialysis membrane which is strong enough, we prefer that it have a permselectivity of at least 90% and a capacity of at least 0.9 meg./g. The catholytes in our experiments represent simulated spent pickle liquors and the anolytes used were dilute solutions of the appropriate acid. Initially, cells with 27 ml compartments were used and subsequently larger cells with 200 ml compartments and with 2,000 ml compartments, and as high as 8,000 ml for the anolyte.

In Table III data are shown concerning the solution concentration changes that occur and in Table IV data are shown on the current efficiencies of the anodic and cathodic processes. Whereas for HCl the iron plating process was reasonably efficient the acid buildup in the anolyte was not; anode reactions included evolution of chlorine gas and this complication may prevent practical utilization of electrolysis for recovery of spent HCl solutions. In agreement with published results on electrolysis of spent $H_2SO_4$, insignificant amounts of iron were electrodeposited until the free acid concentration was substantially reduced in the catholyte; during later stages the iron deposition process improves somewhat. Even though the efficiency of iron electrodeposition is poor, the buildup process of free acid in the anolyte solution has a current efficiency of 50%. Advantages in use of $HBF_4$ for pickling are readily apparent.

With $HBF_4$ solutions, iron electrodeposition on the cathode proceeds at significant rates even in the presence of moderately high levels of free acid. Current efficiencies based on the iron plating and acid buildup processes on the order of 50% are typical and, under some conditions, may exceed this level. Recovered iron can be melted and used in steelmaking operations.

Table III

Electrolysis Experiments Using Anion Permselective Membrane to Separate Catholyte and Anolyte Solutions: Changes in Solution Concentration

| Acid Used | Size Cell Compartments, ml | Current Density, amp/in.² | Time, hrs. | Faradays Consumed | Concentration, grams per liter | | | |
|---|---|---|---|---|---|---|---|---|
| | | | | | Anolyte | | Catholyte | |
| | | | | | Free Acid | Iron | Free Acid | Iron |
| HCl | 27 | — | 0 | M | 22.6 | 0.38 | 2.2 | 132.4 |
| HCl | 27 | 0.5 | 4 | 0.224 | 82.2 | 0.02 | 0.7 | 22.4 |
| $H_2SO_4$ | 27 | — | 0 | — | 26.0 | 0.02 | 114.6 | 71.9 |
| $H_2SO_4$ | 27 | 0.5 | 4 | 0.224 | 196.0 | 0.02 | 6.8 | 74.1 |
| $H_2SO_4$ | 27 | 0.5 | 8 | 0.448 | | | | |
| $H_2SO_4$ | 200 | — | 0 | — | 26.0 | 0.002 | 111.2 | 74.8 |
| $H_2SO_4$ | 200 | 0.5 | 4 | 0.522 | 92.6 | 0.5 | 54.4 | 80.1 |
| $HBF_4$ | 200 | — | 0 | — | 15.8 | <0.002 | 60.7 | 137.9 |
| $HBF_4$* | 200 | 0.5 | 2 | 0.261 | 74.8 | 0.3 | 34.3 | 136.6 |
| $HBF_4$ | 200 | — | 0 | — | 16.3 | 15.7 | 60.6 | 137.9 |
| $HBF_4$* | 200 | 0.5 | 2 | 0.261 | 108.7 | 13.5 | 27.7 | 137.4 |
| $HBF_4$* | 200 | 0.5 | 4 | 0.522 | 180.4 | 12.5 | 25.1 | 122.5 |
| $HBF_4$ | 200 | — | 0 | — | 16.3 | 15.7 | 29.5 | 142.2 |
| $HBF_4$ | 200 | 1.0 | 4 | 1.044 | 261.8 | 13.5 | 19.8 | 100.6 |
| $HBF_4$ | 200 | — | 0 | — | 3.2 | 53.8 | 3.2 | 53.8 |
| $HBF_4$ | 200 | 0.5 | 4 | 0.522 | 164.6 | 46.4 | 0.7 | 20.1 |
| $HBF_4$ | 2000 | — | 0 | — | 17.0 | 0.1 | 27.3 | 147.4 |
| $HBF_4$ | 2000 | 0.833 | 7 | 15.66 | 286.0 | 7.0 | 7.0 | 40.5 |
| $HBF_4$ | 2000 | — | 0 | — | 18.5 | 0.2 | 50.2 | 197.6 |
| $HBF_4$ | 2000 | 0.833 | 3.5 | 7.83 | 210.0 | 21.0 | 28.0 | 128.0 |

*160°F — other runs at 120°F

Table IV

Electrolysis Experiments Using Anion Permselective Membrane to Separate Catholyte and Anolyte Solutions: Efficiency of Process

| Acid Used | Size Cell Compartments, ml | Current Density, amps/in.² | Time, hours | Faradays Consumed | Electrodeposited Iron | | Equiv. of Free Acid buildup in Electrolyte | Current Efficiency, % | |
|---|---|---|---|---|---|---|---|---|---|
| | | | | | Wt., g. | Equiv. | | Based on Fe Deposited | Based on Acid in Anolyte |
| HCl | 27 | — | 0 | — | — | — | — | — | — |
| HCl | 27 | 0.5 | 4 | 0.224 | 3.8 | 0.1340 | 0.0442 | 60 | 20 |
| $H_2SO_4$ | 27 | — | 0 | — | — | — | — | — | — |
| $H_2SO_4$ | 27 | 0.5 | 4 | 0.224 | 0.2 | 0.0060 | 0.0936 | 3 | 42 |
| $H_2SO_4$ | 27 | 0.5 | 8 | 0.448 | 2.0 | 0.0700 | 0.1717 | 16 | 38 |

Table IV-continued

Electrolysis Experiments Using Anion Permselective Membrane to Separate Catholyte and Anolyte Solutions: Efficiency of Process

| Acid Used | Size Cell Compartments, ml | Current Density, amps/in.$^2$ | Time, hours | Faradays Consumed | Electro-deposited Iron Wt., g | Equiv. | Equiv. of Free Acid buildup in Electrolyte | Current Efficiency, % Based on Fe Deposited | Based on Acid in Anolyte |
|---|---|---|---|---|---|---|---|---|---|
| $H_2SO_4$ | 200 | — | 0 | — | — | — | — | — | — |
| $H_2SO_4$ | 200 | 0.5 | 4 | 0.522 | 0.06 | 0.0021 | 0.2717 | 0.4 | 52 |
| $HBF_4$ | 200 | — | 0 | — | — | — | — | — | — |
| $HBF_4$* | 200 | 0.5 | 2 | 0.261 | 2.7 | 0.0967 | 0.1344 | 37 | 52 |
| $HBF_4$ | 200 | — | 0 | — | — | — | — | — | — |
| $HBF_4$* | 200 | 0.5 | 2 | 0.261 | 3.6 | 0.1289 | 0.2105 | 81 | 49 |
| $HBF_4$* | 200 | 0.5 | 4 | 0.522 | 8.1 | 0.2901 | 0.3738 | 72 | 56 |
| $HBF_4$ | 200 | — | 0 | — | — | — | — | — | — |
| $HBF_4$ | 200 | 1.0 | 4 | 1.044 | 13.6 | 0.4871 | 0.5592 | 54 | 47 |
| $HBF_4$ | 200 | — | 0 | — | — | — | — | — | — |
| $HBF_4$ | 200 | 0.5 | 4 | 0.522 | 9.1 | 0.3259 | 0.3593 | 62 | 69 |
| $HBF_4$ | 2000 | — | 0 | — | — | — | — | — | — |
| $HBF_4$* | 2000 | 0.833 | 7 | 15.66 | 206.0 | 7.3768 | 5.9991 | 47 | 38 |
| $HBF_4$ | 2000 | — | 0 | — | — | — | — | — | — |
| $HBF_4$* | 2000 | 0.833 | 3.5 | 7.83 | 139.2 | 4.9847 | 4.3342 | 64 | 55 |

*160°F — other runs at 120°F

The concentration of $HBF_4$ in the pickling bath may range from 10 to 450 grams per liter. We prefer a concentration range from 65 to 130 grams per liter. Although at least some pickling effect will be observed for contact times as low as 30 seconds, as a practical matter the contact time for continuous strip pickling should be no less than 45 seconds in order to achieve a product of minimum acceptability; contact times as long as one hour will cause some loss of base metal, although not to the extent obtained with uninhibited sulfuric or hydrochloric acid. Temperatures may range from room temperature to 212°F, although a range of 175°F to 200°F is preferred.

Iron values may be recovered from the spent acid in the same electrodialysis operation in which the acid is recovered. For this purpose we prefer to use a permselective ion exchange membrane in an electrolytic bath. Direct currents may range from 10 to 600 amperes per square foot, although a range of 50 to 300 amperes per square foot is preferred. Efficiencies are best when the initial iron concentration in the catholyte solution is high relative to the acid concentration in the catholyte solution; iron concentrations should be at least 50 grams per liter, preferably 50 to 150 g/l, and preferred acid concentrations are below 30 grams per liter.

Recovery runs were made using volume ratios of anolyte to catholyte of 4:1, as may be seen in Table V. Membrane areas used were 72 in.$^2$ for the 2,000:4,000 runs, 36 in.$^2$ for the 1,000:4,000 runs, and 18 in.$^2$ for the 500:2,000 in.$^2$. As before, low-carbon sheet steel cathodes were used and graphite anodes with Dynel anode bags. Although current efficiencies for iron and acid recovery were high as current densities were increased 600 A/ft.$^2$ (4.166 A/in.$^2$), there were operating difficulties that might be expected to become worse if higher current densities were employed. For runs at 400 and at 600 A/ft.$^2$ (2.777 and 4.166 A/in.$^2$) the catholyte and anolyte solutions became heated to 220°F. The applied voltage required increased with current density, i.e., from 5 to 12 volts for current densities up to 300 A/ft.$^2$ and over 20 volts for current densities of 400 and 600 A/ft.$^2$ Deterioration of the graphite anodes increased at the higher current densities and, in spite of the use of anode bags, particulate carbon was introduced into the anolyte solution. Further, there was some evidence ($HBF_4$ concentrations in the catholyte solutions) of decreased membrane permselectivity and/or increased anion diffusion from the anolyte to the catholyte solution.

Table V

Electrolysis Experiments With Fe$(BF_4)_2$ - $HBF_4$ Solutions Using Anion Permselective Membrane to Separate Catholyte and Anolyte Solutions

| Volume of Solution in cell, ml. Catholyte | Anolyte | Solution Temp. °F | Current Density amps/in$^2$ | Time, hrs. | Faradays Consumed | Electro-deposited Iron Wt.,g | Equiv. | Current Efficiency Based on Fe Deposited | Based on Acid in Anolyte | Concentration, g/l. Anolyte Free Acid | Catholyte Iron | Catholyte Free Acid | Iron |
|---|---|---|---|---|---|---|---|---|---|---|---|---|---|
| 2000 | 8000 | 160 | — | 0 | — | — | — | — | — | 19 | <0.1 | <1 | 162.5 |
| 2000 | 8000 | 160 | 0.833 | 7 | 15.67 | 266 | 9.525 | 60.8 | 46.5 | 99 | <0.1 | <1 | 24.4 |
| 2000 | 8000 | 180 | — | 0 | — | — | — | — | — | 36 | <0.2 | 19 | 146.2 |
| 2000 | 8000 | 180 | 1.042 | 5 | 13.99 | 252* | 9.038* | 50.8* | 64.6 | 114 | <0.2 | 2 | 20.0 |
| 2000 | 8000 | 180 | — | 0 | — | — | — | — | — | 16 | 0.5 | <1 | 155.6 |
| 2000 | 8000 | 180 | 1.250 | 5 | 16.79 | 306* | 10.958* | 65.3* | 49.9 | 108 | 10.4 | <1 | 5.5 |
| 1000 | 4000 | 170 | — | 0 | — | — | — | — | — | 27 | 0.4 | 23 | 169.0 |
| 1000 | 4000 | 170 | 1.250 | 5 | 8.39 | 169 | 6.052 | 72.1 | 64.0 | 145 | 1.3 | 2 | 2.9 |
| 1000 | 4000 | 170 | — | 0 | — | — | — | — | — | 24 | <0.1 | 36 | 170.0 |
| 1000 | 4000 | 170 | 1.667 | 4 | 8.95 | 156 | 5.586 | 62.4 | 58.5 | 139 | 0.7 | 1 | 3.9 |
| 1000 | 4000 | 180 | — | 0 | — | — | — | — | — | 24 | <0.1 | 19 | 150.1 |
| 1000 | 4000 | 180 | 2.083 | 2.5 | 6.99 | 131* | 4.702* | 67.2* | 71.6 | 134 | <0.1 | 3 | 18.8 |
| 500 | 2000 | 220 | — | 0 | — | — | — | — | — | 26 | 0.2 | 66 | 174.7 |
| 500 | 2000 | 220 | 2.777 | 1.5 | 2.80 | 50 | 1.791 | 64.0 | 78.1 | 122 | 0.6 | 31 | 64.3 |
| 500 | 2000 | 220 | — | 0 | — | — | — | — | — | 26 | 0.1 | 49 | 174.7 |
| 500 | 2000 | 220 | 4.166 | 0.5 | 1.40 | 26.5 | 0.949 | 67.8 | 71.5 | 70 | 0.7 | 79 | 121* |

*Calculated from deposited iron

We claim:

1. Method of pickling steel comprising contacting the steel with a pickling solution consisting of fluoboric acid, subjecting the spent fluoboric acid to electrodialysis by introducing the spent acid into the cathode compartment of a cell having said cathode compartment separated from an anode compartment by anion exchange membrane, recovering the iron on the cathode thereof and recycling the acid from the anolyte.

2. Method of claim 1 in which the current is from 10 to 600 amperes per square foot of membrane.

3. Method of claim 1 in which the current is from 50 to 300 amperes per square foot of membrane.

4. Method of claim 1 in which the initial iron concentration in the catholyte solution is above 50 grams per liter and the initial acid concentration is below 30 grams per liter.

5. Method of recovering iron values and fluoboric acid from a spent pickling solution of fluoboric acid comprising subjecting said spent pickling solution to electrodialysis, recovering the iron on the cathode thereof, and recovering the acid from the anolyte.

6. Method of claim 5 in which the electrodialysis is conducted in a cell separated by an anion exchange membrane into an anode compartment and a cathode compartment.

7. Method of claim 5 in which the current is from 10 to 600 amperes per square foot of membrane.

8. Method of claim 5 in which the current is from 50 to 300 amperes per square foot of membrane.

* * * * *